United States Patent Office 3,814,725
Patented June 4, 1974

3,814,725
POLYALKYLENE TEREPHTHALATE
MOLDING RESIN
Daniel Zimmerman, East Brunswick, and Robert B. Isaacson, Springfield, N.J., assignors to Celanese Corporation, New York, N.Y.
No Drawing. Continuation-in-part of abandoned application Ser. No. 854,259, Aug. 29, 1969. This application June 26, 1973, Ser. No. 373,834
Int. Cl. C08g 51/04
U.S. Cl. 260—40 R
18 Claims

ABSTRACT OF THE DISCLOSURE

An improved molding resin comprising a reinforcing filler and a polypropylene terephthalate or a polybutylene terephthalate and process for producing same.

This application is a continuation-in-part application of our copending application Ser. No. 854,259 filed Aug. 29, 1969 now abandoned.

This invention relates to an improved molding resin and to the method of producing same. The invention is directed to an improved molding resin comprising an intimate blend of a reinforcing filler and a polybutylene terephthalate or a polypropylene terephthalate. The molding resin of this invention has significant processing and property advantages over an equivalently filled polyethylene terephthalate molding resin.

Polyethylene terephthalate polymer containing reinforcing fillers have been satisfactorily used as molding resins for various end uses. The use of filled polyethylene terephthalate polymer for molding purposes has processing disadvantages in requiring high processing temperatures, high mold temperatures, long cycle times in the mold and usually requires a nucleating agent or other additive to provide an adequate polymer flow in the mold. The preparation of polyethylene terephthalate polymers as well as polypropylene terephthalate and polybutylene terephthalate polymers are described in U.S. Pat. 2,465,-319 entitled "Polymeric Linear Terephthalic Esters." Polyethylene terephthalic polymers have been extensively used for making fiber products, film products and molding products. It has been well recognized especially in the fiber and film production area because of their outstanding physical properties to the exclusion of the other polymeric linear terephthalic esters especially polypropylene terephthalate and polybutylene terephthalate polymers.

It has now been discovered that improved molding resins are provided by the intimate blending of reinforcing fillers with polypropylene terephthalate or polybutylene terephthalate. The improved molding resins of this invention have been found to require lower processing temperatures, lower mold temperatures, shorter cycle time and no nucleating agent when compared with equivalent filled polyethylene terephthalate. Surprisingly, the excellent processability of the molding resins of this invention is accompanied by a balance of properties which make it even more desirable than polyethylene terephthalate. For example, glass filled polybutylene terephthalate resin has almost identical strength compared to the equivalent glass filled polyethylene terephthalate but substantially higher toughness, lower water absorption, better creep (flexural) properties and desirable color. The molding resins of this invention solves the processing problems associated with the equivalent filled polyethylene terephthalate molding resin as well as providing a balance of properties which are significantly improved over those of polyethylene terephthalate.

The base of the molding resins of this invention is a polyalkylene terephthalate polymer selected from the group consisting of polypropylene terephthalate and polybutylene terephthalate. These polymers can be produced from the reaction product of terephthalic acid or a dialkyl ester of terephthalic acid (especially dimethyl terephthalate) and glycols having 3 and 4 carbon atoms. Suitable glycols include trimethylene glycol, tetramethylene glycol, 1,3-butylene glycol, 1,2-propylene glycol, 1,2-butylene glycol, 2,3-butylene glycol and the like. The polymers as used have an intrinsic viscosity in the range of from about 0.2 to about 1.2 deciliters per gram and a preferred intrinsic viscosity range from about 0.5 to about 1.0 deciliters per gram. The intrinsic viscosity is measured in a standard way utilizing an 8 weight percent polymer solution in orthochlorophenol at 25° C.

In the production of the polymers of this invention i.e., polypropylene or polybutylene terephthalate, the appropriate monomeric bis(hydroxyalkyl) terephthalate is produced as the intermediate. The dialkyl ester of terephthalic acid in which the alkyl radicals can contain from 1 to 7 carbon atoms can generally be reacted with about two molecular proportions of the glycols described above. It is preferred to use higher proportions of the glycol, i.e., in excess of two molecular proportions of the glycol per molecular proportion of the terephthalate derivative, since by using such proportions, the initial transesterification is caused to take place more rapidly and completely.

The reaction for the transesterification is conducted under conditions of elevated temperatures and atmospheric, subatmospheric or superatmospheric pressure. Normally, the desired temperatures of the reaction can range from about the boiling temperature of the reaction mixture to as high as 250° C. if desired.

After the polymer base is prepared, the reinforcing fillers can be intimately blended by either dry blending or melt blending, blended in extruders, heated rolls or other types of mixers. If desired, the reinforcing fillers can be blended with the monomers in the polymerization reaction as long as the polymerization reaction is not affected. The types of fillers which can be used include among others glass fibers (chopped or continuous rovings) asbestos fibers, cellulosic fibers, cotton fabric paper, synthetic fibers, metallic powders and the like. The amount of reinforcing filler can range from about 2 to about 60 weight percent based on the total molding composition. Other additives for appearance and property improvements can be incorporated into the molding resins of this invention such as colorants, plasticizers, stabilizers, hardeners and the like. The molding resins of this invention are essentially free of mold release agent or agents which causes non-uniform surfaces.

The following examples will serve to illustrate the invention without limiting the same.

EXAMPLE I

Fifteen pounds of polybutylene terephthalate having an intrinsic viscosity of 0.82 was added to 7.7 pounds of glass fibers, tumble blended for 1 minute and then extrusion blended by force feeding through a one inch single screw extruder with a strand die. The temperatures of the extruder and die were set at 500, 510, 510 and 500° F. (from barrel to die). The strands were ground in a milling type mixer to pass through a large screen (4 mesh or smaller).

For comparative purposes polyethylene terephthalate having an intrinsic viscosity of 0.65 was blended with glass fibers in the same proportions and manner as described above for the polybutylene terephthalate polymer. In order to facilitate the crystallization of polyethylene terephthalate in the mold, 0.5 weight percent of talc was added to the polymer. Processing of the polyethylene terephthalate molding resin was exactly identical to the polybutylene terephthalate molding resin above except for slightly higher temperature requirements (530–540° F.) in the extrusion blending step. The above molding resins were molded into test specimens and tested for the following properties as described in Table I below.

TABLE I

Properties of glass filled polybutylene terephthalate vs. glass filled polyethylene terephthalate

| Material | Polyethylene terephthalate | Polybutylene terephthalate |
|---|---|---|
| Glass content | 35.4 | 34.1 |
| Processing temperature (° C.) | 260 | 240 |
| Cycle time (sec.) | 52 | 32 |
| Mold temperature (° C.) | 140 | 90 |
| I.V. base (dl./g.) | .65 | .82 |
| I.V. molded bar (dl./g.) | .56 | .69 |
| Notched izod (ft.-lb./in.) | .8 | 1.5 |
| Tensile impact (ft.-lb./in.) | 28 | 36 |
| Heat deflection temp. at 264 p.s.i. (° F.) | 423 | 413 |
| Tensile strength (p.s.i.) | 18,800 | 18,200 |
| Flexural strength (p.s.i.) | 25,000 | 25,100 |
| Flexural modulus (p.s.i.) | $1.5 \times 10^6$ | $1.4 \times 10^6$ |
| Shrinkage (mils/in.) | 1.5 | 1.0 |
| Water absorption, 24 hrs. (percent) | 0.11 | 0.06 |
| Water absorption, saturation (percent) | 0.27 | 0.20 |
| Color | (1) | (2) |
| Hardness—Rockwell | M90 | M84 |

[1] Dark grey. [2] Light grey.

The glass filled polybutylene terephthalate resin has significant advantages over the equivalent filled glass filled polyethylene terephthalate. Compared to polyethylene terephthalate, polybutylene terephthalate can be processed at lower temperatures, at a significantly lower cycle time and with a lower mold temperature. It has significantly higher notched Izod and tensile impact, less shrinkage and lower water absorption. All of these improved properties of the glass filled polybutylene terephthalate resin are highly desirable and significant when compared to equivalent glass filled polyethylene terephthalate resin. In a similar manner, glass filled polypropylene terephthalate would provide similar improvements over the equivalent glass filled polyethylene terephthalate as indicated in Table II below.

TABLE II

Properties of glass filled polypropylene terephthalate vs. glass filled polyethylene terephthalate

| Material | Polyethylene terephthalate | Polypropylene terephthalate |
|---|---|---|
| Glass content (percent) | 35.4 | 30 |
| Processing temperature (° C.) | 260 | 240 |
| Cycle time (seconds) | 52 | 45 |
| Mold temperature (° C.) | 140 | 65 |
| I.V. base (dl./g.) | .65 | .7 |
| I.V. molded bar (dl./g.) | .56 | .65 |
| Notched izod (ft.-lbs./in.) | .8 | 2.0 |
| Heat deflection temperature at 164 p.s.i. (° F.) | 432 | 426 |
| Tensile strength (p.s.i.) | 18,800 | 20,500 |
| Flexural strength (p.s.i.) | 25,000 | 28,700 |
| Flexural modulus (p.s.i.) | $1.5 \times 10^6$ | $1.41 \times 10^6$ |

EXAMPLES II–V

In a similar manner as in Example I, polybutylene terephthalate was blended with glass fibers in various amounts. The properties of molded bars were obtained as described in Table III below.

TABLE III

| Property | | | |
|---|---|---|---|
| Percentage glass | 0 | 20 | 30 |
| Specific gravity | 1.32 | 1.45 | 1.52 |
| Water absorption, percent | 0.09 | 0.07 | 0.07 |
| Intrinsic viscosity | 0.81 | 0.81 | 0.82 |
| Tensile strength, p.s.i., 23° C. | 8,300 | 14,300 | 14,700 |
| Tensile elongation, percent, 23° C. | 13 | 1.0 | 1.0 |
| Flexural strength, p.s.i. | 13,000 | 19,600 | 19,600 |
| Flexural modulus, p.s.i. | $3.88 \times 10^5$ | $9.22 \times 10^5$ | $1.13 \times 10^6$ |
| Tensile strength, 73° C., p.s.i. | | 7,800 | 8,100 |
| Tensile elongation 73° C., percent | | 13 | 12 |
| Impact strength, p.s.i.: | | | |
| a—Notched | 0.5 | 0.9 | 1.1 |
| b—Unnotched | 6.9 | 4.5 | 4.2 |
| Rockwell hardness, M | 79 | 88 | 83 |
| Heat distortion temp., ° C.: | | | |
| a—66 p.s.i. | 177 | | |
| b—264 p.s.i. | 73 | 209 | 213 |
| Flammability, in./min.: | | | |
| a—ASTM | 0.62 | 0.93 | 1.25 |
| b—UL | 0.74 | 1.12 | 1.10 |

It is to be understood that the foregoing description is merely illustrative and preferred embodiments of the invention of which many variations may be made by those skilled in the art within the scope of the following claims without departing from the spirit thereof.

What we claim is:

1. A molding resin comprising an intimate blend of a polyalkylene terephthalate polymer having an intrinsic viscosity in the range of from about 0.2 to about 1.2 deciliters per gram and from about 2 to about 80 weight percent of the total composition of a reinforcing filler, wherein said polyalkylene terephthalate is selected from the group consisting of polypropylene terephthalate and polybutylene terephthalate and said blend is essentially free of mold release agent which causes non-uniform surfaces.

2. The composition of claim 1 wherein the reinforcing filler is glass fiber.

3. The composition of claim 1 wherein the reinforcing filler is asbestos.

4. The composition of claim 1 wherein the reinforcing filler is a synthetic fiber.

5. The composition of claim 1 wherein the reinforcing filler is present in amounts ranging from about 5 to about 60 weight percent of the resin.

6. The composition of claim 5 wherein the intrinsic viscosity of the polyalkylene terephthalate ranges from 0.5 to 1.0.

7. The composition of claim 5 wherein the polyalkylene terephthalate is polybutylene terephthalate.

8. The composition of claim 6 wherein the polyalkylene terephthalate is polypropylene terephthalate.

9. A molding resin comprising an intimate blend of polybutylene terephthalate polymer having an intrinsic viscosity in the range of from about 0.5 to about 1.0 and from about 5 to about 60 weight percent of the total composition of glass fiber wherein said blend is essentially free of mold release agent which causes non-uniform surfaces.

10. A method for producing an improved molding resin comprising intimately blending a polyalkylene terephthalate polymer having an intrinsic viscosity in the range of from about 0.2 to about 1.2 and from about 2 to about 80 weight percent of the total composition of a reinforcing filler, wherein said polyalkylene terephthalate is selected from the group consisting of polypropylene terephthalate and polybutylene terephthalate and said blend is essentially free of mold release agent which causes non-uniform surfaces.

11. The method of claim 10 wherein the reinforcing filler is glass fiber.

12. The method of claim 10 wherein the reinforcing filler is asbestos.

13. The method of claim 10 wherein the reinforcing filler is a synthetic fiber.

14. The method of claim 10 wherein the reinforcing filler is present in amounts ranging from about 5 to about 60 weight percent of the resin.

15. The method of claim 14 wherein the intrinsic viscosity of polyalkylene terephthalate ranges from about 0.5 to 1.0.

16. The method of claim 15 wherein the polyalkylene terephthalate is polybutylene terephthalate.

17. The method of claim 15 wherein the polyalkylene terephthalate is polypropylene terephthalate.

18. A method for producing an improved molding resin comprising intimately blending polybutylene terephthalate polymer having an intrinsic viscosity in the range from about 0.5 to about 1.0 and from about 5 to about 60 weight percent of the total composition of glass fiber wherein the blend is essentially free of mold release agent which causes non-uniform surfaces.

References Cited

UNITED STATES PATENTS

| | | | |
|---|---|---|---|
| 2,764,718 | 9/1956 | Peck et al. | 260—40 R X |
| 3,692,744 | 9/1972 | Rich et al. | 260—75 T |

FOREIGN PATENTS

| | | | |
|---|---|---|---|
| 1,010,043 | 11/1965 | Great Britain | 260—40 R |

OTHER REFERENCES

*Modern Plastics Encyclopedia—1967*, Vol. 44, No. 1A, September 1966, p. 587.

ALLEN LIEBERMAN, Primary Examiner

S. M. PERSON, Assistant Examiner

UNITED STATES PATENT OFFICE
CERTIFICATE OF CORRECTION

Patent No. 3,814,725　　　　　　　　　　Dated　　　June 4, 1974

Inventor(s)　Daniel Zimmerman and Robert B. Isaacson

It is certified that error appears in the above-identified patent and that said Letters Patent are hereby corrected as shown below:

In Column 3, line 67, in Table II "Heat deflection temperature at 164 p.s.i." should read -- Heat deflection temperature at 264 p.s.i. --

In Column 4, line 10 in Table III "13,000" should read -- 13,100 --

In Column 3, line 31 in Table I "423" should read -- 432 --

Signed and Sealed this

Seventeenth Day of August 1976

[SEAL]

Attest:

RUTH C. MASON
*Attesting Officer*

C. MARSHALL DANN
*Commissioner of Patents and Trademarks*

Disclaimer 3,814,725.—*Daniel Zimmerman*, East Brunswick, and *Robert B. Isaacson*, Springfield, N.J. POLYALKYLENE TEREPHTHALATE MOLDING RESIN. Patent dated June 4, 1974. Disclaimer filed Apr. 6, 1977, by the assignee, *Celanese Corporation*.

Hereby enters this disclaimer to all claims (1 through 18 inclusive) of said patent.

[*Official Gazette May 24, 1977.*]